(12) United States Patent
Ganor

(10) Patent No.: US 10,234,243 B2
(45) Date of Patent: Mar. 19, 2019

(54) ANTIBALLISTIC ARMOR COMPRISING A SUPER-HARD STRIKE FACE

(71) Applicant: A. Jacob Ganor, Kowloo (HK)

(72) Inventor: A. Jacob Ganor, Kowloo (HK)

( * ) Notice: Subject to any disclaimer, the term of this patent is extended or adjusted under 35 U.S.C. 154(b) by 78 days.

(21) Appl. No.: 15/181,002

(22) Filed: Jun. 13, 2016

(65) Prior Publication Data

US 2017/0241747 A1 Aug. 24, 2017

Related U.S. Application Data

(60) Provisional application No. 62/174,991, filed on Jun. 12, 2015.

(51) Int. Cl.
| | | |
|---|---|---|
| *F41H 5/02* | (2006.01) | |
| *F41H 5/04* | (2006.01) | |
| *B32B 9/00* | (2006.01) | |
| *B32B 5/02* | (2006.01) | |
| *B32B 5/18* | (2006.01) | |
| *B32B 5/24* | (2006.01) | |
| *B32B 5/26* | (2006.01) | |

(Continued)

(52) U.S. Cl.
CPC ............. *F41H 5/0414* (2013.01); *B32B 3/12* (2013.01); *B32B 5/024* (2013.01); *B32B 5/18* (2013.01); *B32B 5/245* (2013.01); *B32B 5/26* (2013.01); *B32B 9/002* (2013.01); *B32B 9/005* (2013.01); *B32B 9/007* (2013.01); *B32B 9/041* (2013.01); *B32B 9/043* (2013.01); *B32B 9/045* (2013.01); *B32B 9/046* (2013.01); *B32B 9/06* (2013.01); *B32B 15/046* (2013.01); *B32B 15/08* (2013.01); *B32B 15/12* (2013.01); *B32B 15/14* (2013.01); *B32B 15/18* (2013.01); *B32B 15/20* (2013.01); *B32B 17/00* (2013.01); *B32B 27/12* (2013.01); *B32B 27/32* (2013.01); *B32B 29/02* (2013.01); *F41H 5/0421* (2013.01); *F41H 5/0428* (2013.01); *F41H 5/0492* (2013.01); *B32B 2255/20* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/536* (2013.01); *B32B 2307/56* (2013.01); *B32B 2571/02* (2013.01)

(58) Field of Classification Search
CPC ........ F41H 5/02; F41H 5/0414; F41H 5/0421; F41H 5/0428
USPC ............ 89/36.02, 36.07, 36.08, 36.04, 36.05
See application file for complete search history.

(56) References Cited

U.S. PATENT DOCUMENTS

| | | |
|---|---|---|
| 6,389,594 B1 | 5/2002 | Yavin |
| 9,046,324 B2 | 6/2015 | Bergman et al. |

(Continued)

*Primary Examiner* — J. Woodrow Eldred
(74) *Attorney, Agent, or Firm* — Jenei LLC

(57) ABSTRACT

A lightweight antiballistic plate assembly includes a ceramic antiballistic plate that is strengthened with a superhard protective layer attached to the strike face of the antiballistic plate. In one embodiment, a strike face of the plate has a layer of superhard material, such as polycrystalline diamond (PCD), attached by sintering. In one embodiment, the ceramic antiballistic plate is made from a mixture of silicon carbide and superhard protective strike face comprising a material selected from the group consisting of polycrystalline diamond (PCD), polycrystalline cubic boron nitride (PCBN), thermally stable polycrystalline diamond and combinations thereof.

4 Claims, 9 Drawing Sheets

(51) Int. Cl.

| | |
|---|---|
| *B32B 9/04* | (2006.01) |
| *B32B 9/06* | (2006.01) |
| *B32B 15/04* | (2006.01) |
| *B32B 15/08* | (2006.01) |
| *B32B 15/12* | (2006.01) |
| *B32B 15/14* | (2006.01) |
| *B32B 15/18* | (2006.01) |
| *B32B 15/20* | (2006.01) |
| *B32B 17/00* | (2006.01) |
| *B32B 27/12* | (2006.01) |
| *B32B 27/32* | (2006.01) |
| *B32B 29/02* | (2006.01) |
| *B32B 3/12* | (2006.01) |

(56) References Cited

U.S. PATENT DOCUMENTS

| | | | |
|---|---|---|---|
| 2005/0217471 A1* | 10/2005 | Benitsch | F41H 5/0414 89/36.02 |
| 2009/0051211 A1* | 2/2009 | Hall | E21B 10/5673 299/105 |
| 2014/0056795 A1 | 2/2014 | Bar-ziv et al. | |
| 2014/0076139 A1 | 3/2014 | Bergman et al. | |
| 2015/0268007 A1 | 9/2015 | Bergman et al. | |

\* cited by examiner

ANTIBALLISTIC ARMOR COMPRISING A SUPER-HARD STRIKE FACE

CROSS-REFERENCE TO RELATED APPLICATIONS

The present application for patent claims priority to U.S. Provisional Application No. 62/174,991, entitled "ANTIBALLISTIC ARMOR COMPRISING A SUPER-HARD STRIKE FACE," filed Jun. 12, 2015, and hereby expressly incorporated by reference herein.

BACKGROUND OF THE INVENTION

1. Field of the Invention

The field of art disclosed herein pertains to armor materials, and more particularly for composite ceramic materials for antiballistic protection.

2. Description of the Related Art

Military standard ESAPI (Enhanced Small Arms Protective Insert) plates are based on technologies that are decades old. For example, monolithic boron carbide (B4C) or Silicon Carbide (SiC) plates over an Aramid backing layer are frequently used. Aramid is a type of polymer and includes the generic family of Kevlar and Nomex.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
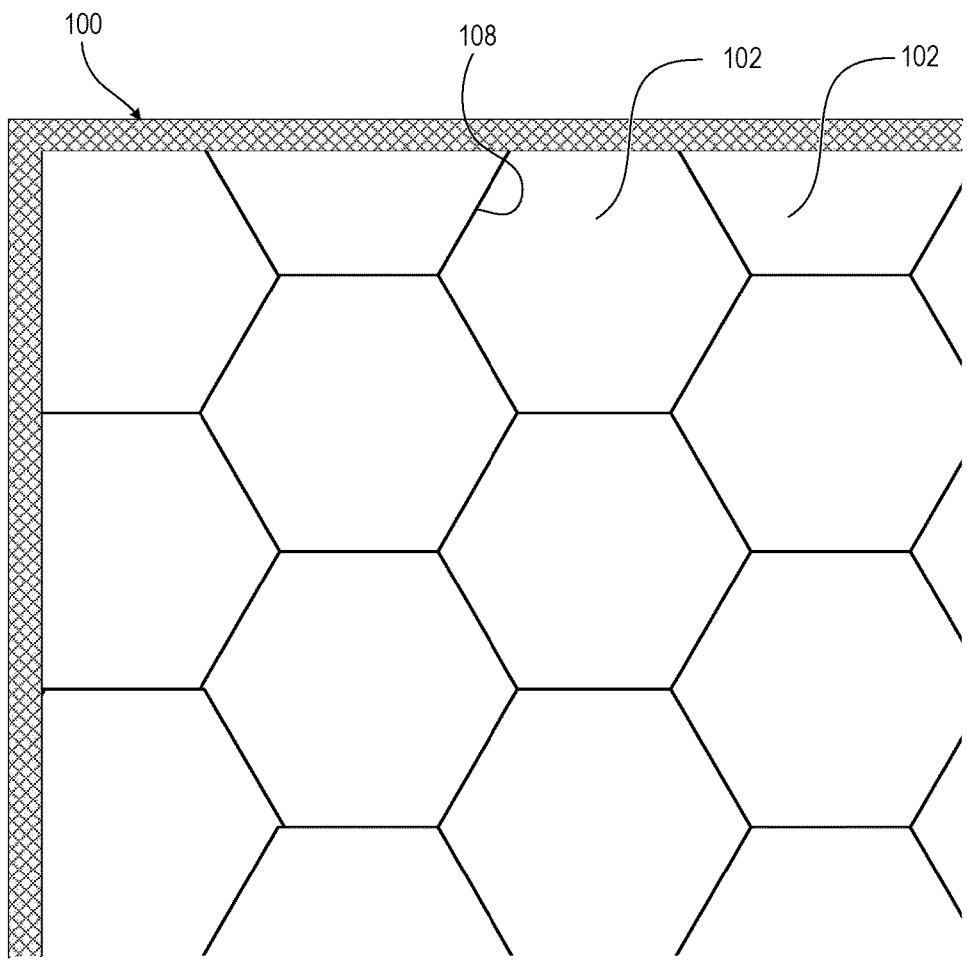
FIG. 1 illustrates a front view of an antiballistic plate assembly, according to one or more embodiments.

A lightweight antiballistic plate assembly includes a ceramic antiballistic plate that is strengthened with superhard layer or coating.

In one or more embodiments, the present invention provides for a plate having a strike face comprising a superhard protective material layer coated or bonded onto a strike face of an antiballistic plate acting as the plate substrate.

In one or more embodiments, the superhard protective material comprises a crystalline or polycrystalline carbon layer.

In one or more embodiments, the superhard protective material comprises a crystalline or polycrystalline boron nitride layer.

In one or more embodiments, the present invention provides for an aggregation comprising a plurality of superhard grains arranged over at least a part of a surface of the plate substrate material.

Superhard Layer

In one or more embodiments of the invention, the superhard protective material comprises polycrystalline diamond (PCD), polycrystalline cubic boron nitride (PCBN), thermally stable polycrystalline diamond, osmium diboride ($OsB_2$), rhenium diboride ($ReB_2$), tungsten tetraboride ($WB_4$), boron suboxide (B6O), overstoichiometric titanium boride (TiB2.2-TiB2.4), AlCrN/a-$Si_3N_4$ nanocomposites, AlTiN/a-Si3N4 nanocomposites, and combinations and composites comprised predominantly of the above-mentioned materials.

In one or more embodiments of the invention, the superhard protective material comprises polycrystalline diamond (PCD), polycrystalline cubic boron nitride (PCBN), thermally stable polycrystalline diamond and combinations thereof.

As used herein, "superhard" or "ultra-hard" material has Vickers hardness of at least about 35 GPa. Such superhard materials may include but are not limited to synthetic and natural diamond, polycrystalline diamond (PCD), cubic boron nitride (cBN), osmium diboride (OsB2), rhenium diboride (ReB2), tungsten tetraboride (WB4), polycrystalline cBN (PCBN), diamond-like carbon, boron suboxide, aluminum magnesium boride, and other materials in the boron-nitrogen-carbon phase diagram which have shown hardness values similar to cBN and other ceramic materials.

Superhard materials include diamond, cubic boron nitride (c-BN), carbon nitrides and ternary compounds such as B—N—C, nanocrystalline diamond/aggregated diamond nanorods. In one or more embodiments, the superhard material layer may be comprised of polycrystalline diamond (PCD), a polycrystalline cubic boron nitride, a thermally stable product TSP material such as thermally stable polycrystalline diamond, or combinations thereof. Polycrystalline boron nitrides include polycrystalline cubic boron nitride (sphalerite structure; PCBN or cBN), which can be PVD coated onto a substrate. Generally these are ceramic composites with a cBN content of 40-65%. The composites may contain ceramic binder; high content cBN grades comprise 85% to almost 100% cBN; may contain metallic binder wurtzite boron nitride (wBN).

Other examples of superhard materials include certain composite materials comprising diamond or cBN grains held together by a matrix comprising ceramic material, such as silicon carbide (SiC), or by cemented carbide material such as Co-bonded WC material (for example, as described in U.S. Pat. Nos. 5,453,105 or 6,919,040). For example, certain SiC-bonded diamond materials may comprise at least about 30 volume percent diamond grains dispersed in a SiC matrix (which may contain a minor amount of Si in a form other than SiC). Examples of SiC-bonded diamond materials are described in U.S. Pat. Nos. 7,008,672; 6,709,747; 6,179,886; 6,447,852; and International Application publication number WO2009/013713).

As used herein, polycrystalline diamond (PCD) material comprises a mass (an aggregation of a plurality) of diamond grains, a substantial portion of which are directly inter-bonded with each other and in which the content of diamond is at least about 80 volume percent of the material. Interstices between the diamond grains may be at least partly filled with a binder material comprising a catalyst material for synthetic diamond, or they may be substantially empty. In one or more embodiments, a PCD structure comprises or consists essentially of PCD material and a PCBN structure comprises or consists essentially of PCBN material.

Catalyst material for synthetic diamond is capable of promoting the growth of synthetic diamond grains and or the direct inter-growth of synthetic or natural diamond grains at a temperature and pressure at which synthetic or natural diamond is thermodynamically more stable than graphite. Examples of catalyst materials for diamond are Fe, Ni, Co, Si and Mn, and certain alloys including these. Bodies comprising PCD material may comprise at least a region from which catalyst material has been removed from the interstices, leaving interstitial voids between the diamond grains.

PCBN material comprises grains of cubic boron nitride (cBN) dispersed within a matrix comprising metal or ceramic material. For example, PCBN material may comprise at least about 35 volume percent or at least about 50 volume percent cBN grains dispersed in a matrix material comprising a Ti-containing compound, such as titanium carbide, titanium nitride, titanium carbonitride and/or an Al-containing compound, such as aluminium nitride, and/or compounds containing metal such as Co and/or W. Some versions (or "grades") of PCBN material may comprise at least about 80 volume percent or even at least about 90 volume percent cBN grains.

Thermally stable PCD material comprises at least a part or volume of which exhibits no substantial structural degradation or deterioration of hardness or abrasion resistance after exposure to a temperature above about 400 degrees centigrade, or even above about 700 degrees centigrade. For example, PCD material containing less than about 2 weight percent of catalyst metal for diamond such as Co, Fe, Ni, Mn in catalytically active form (e.g. in elemental form) may be thermally stable. PCD material that is substantially free of catalyst material in catalytically active form is an example of thermally stable PCD. PCD material in which the interstices are substantially voids or at least partly filled with ceramic material such as SiC or salt material such as carbonate compounds may be thermally stable, for example. PCD structures having at least a significant region from which catalyst material for diamond has been depleted, or in which catalyst material is in a form that is relatively less active as a catalyst, may be described as thermally stable PCD.

A "catalyst material" for a superhard material is capable of promoting the growth or sintering of the superhard material.

PCD material and PCBN material may be provided by sintering a plurality of diamond or cBN grains respectively in the presence of a suitable binder or catalyst material onto a substrate, such as a cemented carbide substrate. The PCD or PCBN structure thus produced is likely to be formed joined to the substrate, being an integral part of a construction comprising the PCD or PCBN structure bonded to the substrate during the process in which the respective structure formed into a sintered body.

The term "substrate" or "plate" as used herein means any substrate over which the superhard material layer is formed. For example, a "substrate" as used herein may be a transition layer formed over another substrate. Additionally, as used herein, the terms "radial" and "circumferential" and like terms are not meant to limit the feature being described to a perfect circle. Exemplary substrate materials include semiconductors, polymers and composites, metals, metal alloys, silicon, and the like. Specific examples of the substrate materials include nickel based alloys, cobalt-chrome, stainless steels, acrylic, germanium, titanium alloys, aluminum, carbides, carbon-composites, polyethersulphone, alloy steels, magnesium, polycarbonate, silicon, sapphire, and the like.

As used herein, lonsdaleite or hexagonal diamond is an allotrope of carbon with a hexagonal lattice.

As used herein, "interstices" or "interstitial regions" are regions between the diamond grains of PCD material. In embodiments of PCD material, interstices or interstitial regions may substantially or partially be filled with a material other than diamond, or they may substantially be empty. Embodiments of PCD material may comprise at least a region from which catalyst material has been removed from the interstices, leaving interstitial voids between the diamond grains.

PCD is typically formed in the presence of a sintering aid such as silicon or cobalt, which promotes the inter-growth of diamond grains. Suitable sintering aids for PCD are also commonly referred to as a solvent-catalyst material for diamond, owing to their function of dissolving, to some extent, the diamond and catalyzing its re-precipitation. A solvent-catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent-catalyst material. Most typically, PCD is often formed on a cobalt-cemented tungsten carbide substrate, which provides a source of cobalt solvent-catalyst for the PCD. Materials that do not promote substantial coherent intergrowth between the diamond grains may themselves form strong bonds with diamond grains, but are not suitable solvent-catalysts for PCD sintering.

In one or more embodiments, a carbon-based coating is provided for creating a superhard layer over the plates. The carbon based coating comprising an amorphous carbon thin film deposited on a plate substrate, the carbon based coating characterized in that the carbon-based coating has superhard material properties.

In one or more embodiments, a carbon based coating comprising an amorphous carbon thin film deposited on a substrate is provided. In some embodiments, the thin film is deposited using a low temperature plasma assisted chemical vapor deposition (PACVD) process. In one or more embodiments, the substrate comprises any material that is vacuum stable. Exemplary substrate materials include semi-conductors, polymers and composites, metals, metal alloys, silicon, and the like. Specific examples of the substrate materials include nickel based alloys, cobalt-chrome, stainless steels, acrylic, germanium, titanium alloys, aluminum, carbides, carbon-composites, polyethersulphone, alloy steels, magnesium, polycarbonate, silicon, sapphire, and the like.

In further embodiments, the carbon based thin film comprises amorphous carbon and/or tetrahedral amorphous carbon. In some embodiments, the amorphous carbon comprises $sp^2$ and/or $sp^3$ hybridized bonds. For example, the amorphous carbon may comprise a certain ratio of $sp^2$ to $sp^3$ bonds. In other embodiments, the tetrahedral amorphous carbon comprises a high $sp^3$ bond content. In still other embodiments, the amorphous carbon and/or tetrahedral amorphous carbon comprises nano-crystalline diamond content. In further embodiments, the thin film comprises at least one layer. The thin film can include layers or "zones" that each comprise varying levels of amorphous carbon and/or amorphous tetrahedral carbon. For example, during the PECAVD process, the layers or zones may meld into one another such that the middle portion of one layer can include a different ratio of amorphous carbon to amorphous tetrahedral when the ratio of the one layer is compared to the ratio of carbons in another layer's middle portion. In some embodiments, the carbon-based coating comprises mixtures of polycrystalline diamond and/or amorphous carbon and/or tetrahedral amorphous carbon.

In some embodiments, the carbon-based coating comprises nanocomposite structures that are constructed from multiple hard carbon layers with wide range mechanical properties. These layers, in some embodiments, are comprised of varying levels of glassy amorphous carbon and tetrahedral amorphous carbon content. Interfacial coatings such as Cr or Ni are often applied to substrates prior to coating with diamond-like carbon (DLC) in order to promote adhesion to the base substrate.

Antiballistic Plate

The superhard layer is placed onto the strike face of an antiballistic plate acting as the plate substrate. The antiballistic plates may be made of a single substrate or two or more substrates. Multiple antiballistic plate substrates may be bonded together to form a laminate substrate. Both non-metallic and metallic materials may be used for the antiballistic plates.

In one or more embodiments, the material for the supporting plate substrate is one or more materials selected from non-metallic substrate materials including Aramid (Kevlar), ultra high molecular weight polyethylene (Spectra), Mylar, Fiberglass, Nylon, Nomex, or ceramic composite plates [W. J. Perciballi, U.S. Pat. No. 6,408,733]. Carbon nanotubes and their composites may be used as well [K. Mylvaganam and L. C. Zhang, "Ballistic resistance capacity of carbon nanotubes," Nanotechnology, 47, 475701 (2007)].

In one or more embodiments, the material for the antiballistic plates is one or more materials selected from metallic substrate materials including titanium and steel. Materials manufactured from heavy inorganic materials (metals and ceramics) may also be used.

In one or more embodiments, the material for the antiballistic plates is one or more materials selected from oxides, such as quartz ($SiO2$), alumina or sapphire ($Al2O3$), titanium oxide ($TiO2$), zinc oxide ($ZnO$), magnesium oxide ($MgO$), nickel oxide ($NiO$), zirconia ($ZrO2$), lithium niobate ($LiNbO3$), and lithium tantalate ($LiTaO3$).

In one or more embodiments, the material for the antiballistic plates is one or more materials selected from nitrides, such as boron nitride (BN), aluminum nitride (AlN), gallium nitride (GaN), carbon nitride ($C3N4$), and boron carbon nitride (BCN).

In one or more embodiments, the material for the antiballistic plates is one or more materials selected from carbides, such as silicon carbide (SiC), boron carbide (B4C), aluminum carbide ($Al4C3$), titanium carbide (TiC), zirconium carbide (ZrC), hafnium carbide (HfC), vanadium carbide (VC), niobium carbide (NbC), tantalum carbide (TaC), chromium carbide (CrC), molybdenum carbide (MoC), and tungsten carbide (WC).

In one or more embodiments, the material for the supporting substrate is one or more materials selected from fluorides, such as barium fluoride ($BaF2$), calcium fluoride ($CaF2$), and magnesium fluoride ($MgF2$).

In one or more embodiments, the material for the antiballistic plates is one or more materials selected from heat-resistant materials, such as mica, tantalum hafnium carbide ($Ta_4HfC_5$), pyrolytic carbon, and diamond.

In one or more embodiments, the material for the antiballistic plates is one or more materials selected from polymers, metals, cermets, ceramics, boron carbide (B4C), silicon carbide (SiC), B4C-SiC composites, alumina, aggregated diamond nanorod (ADNR), beryllium borides (e.g., Be2B/Be4B), beryllium oxide (BeO), and composites of any of these with metals, ceramics, carbon nanomaterials, Kevlar, UHMWPE, carbon-carbon, carbon-fiber, fiberglass and other materials.

In one or more embodiments, the cermets and ceramics are boride and carbide based.

In one or more embodiments, the substrate material is a metal comprising one or more of steel, depleted uranium, titanium metal, amorphous metals, metallic glasses, nano-structured metals, and various alloys such as aluminum-lithium, beryllium-aluminum, and iron-boron.

In one or more embodiments, the substrate material is a ceramic composition comprising an oxide ceramic, a boride ceramic, a carbide ceramic or a combination thereof.

In one or more embodiments, the oxide ceramic is selected from the group consisting of silica, alumina, alumina-titania, zirconia, yttria-stablized zirconia, magnesia-stabilized zirconia, ceria-stabilized zirconia, calcia-stabilized zirconia, scandia-stabilized zirconia, zirconia toughened alumina, alumina-zirconia, and a compound oxide.

In one or more embodiments, the composition comprises a boride ceramic and an oxide ceramic.

In one or more embodiments, the ceramic comprises a boride ceramic selected from borides of elements from Groups IVB, VB, VIIB, VIIB, and VIIIB of the periodic table.

In one or more embodiments, the boride ceramic is selected from the group consisting of titanium boride, zirconium boride, and hafnium boride.

In one embodiment the ceramic is a ceramic carbide. In one embodiment the ceramic carbide is selected from carbides of elements from Groups IVB, VB, VIIB, VIIB of the periodic table and iron carbide.

In one or more embodiments, the carbide ceramic is selected from the group consisting of silicon carbide, chromium carbide, and boron carbide.

In one or more embodiments, the substrate is a ceramic comprising one or more of a refractory metal, an oxide, a carbide, a boride or a nitride. The refractory metal may be for example boron. Examples of suitable refractory oxides include aluminium oxide, zirconium oxide, magnesium oxide, yttrium oxide, calcium oxide, chromium oxide and silicon oxide. More than one oxide may be used, and the oxide may be a mixed refractory oxide such as mullite. Examples of suitable carbides include silicon carbide, boron carbide, aluminium carbide and zirconium carbide. More than one carbide may be used. Examples of suitable borides include titanium diboride and calcium hexaboride, and examples of suitable nitrides include silicon nitride, aluminium nitride, titanium nitride, zirconium nitride and sialon. More than one boride and more than one nitride may be used.

In one or more embodiments, the substrate material is a mixture of carbide ceramics with small amounts of metals. In one embodiment, the backing material is a mixture of titanium carbide with nickel and molybdenum.

In one or more embodiments, the ceramic is a ceramic boride or ceramic borate. In one embodiment the ceramic boride is metal boride selected from the group consisting of titanium diboride and calcium hexaboride, silicon hexaboride, rare earth borides, aluminum borides, or combination thereof.

In one or more embodiments, the ceramic borate is metal borate selected from the group consisting of calcium borate, magnesium borate, sodium borate and rare earth borates, or combination thereof.

Plate Structure

In one or more embodiments, the plates may have shape selected from one or more of a cylinder, square, hexagon, circle, dodecagon, triangle, trapezoid or crescent shapes. Application of a chosen shape for the final device may be applied, for instance, to a vest, jacket, helmet, glove, shirt, a pair of pants, a pair of shoes, or a body suit ultimately for wearing by an individual.

Smaller structural shapes like cylinders and hexagons may be used for countering direct gunfire, especially for high multi-hit threats. On the other hand, larger components are advantageous for protection against fragments and IEDs Vehicles will generally use even larger plates. In one or more embodiments, the plates have a face width of at least 200 mm, 150 mm, 100 mm, 85 mm, 70 mm, 60 mm, 50 mm, 30 mm 20 mm, or 15 mm.

In one or more embodiments, the plates are used as inserts for armor vests. They can be shaped to accommodate body shapes by using a multi-curved shape. Depending on the requirements of the individual protection levels, the plate thickness can vary accordingly. The thickness of the plates depends on the specified threat level and can vary. In one or more embodiments, the thickness of the plates for personnel use is between 4 and 25 mm. In another embodiment, the thickness of the plates is between 4 and 15 mm. In one or more embodiments, the thickness of the plates for vehicular use is between 4 and 35 mm. In other embodiments, the thickness of the plates for vehicular use is between 4 and 25 mm.

In one or more embodiments, the plates create larger antiballistic systems based on single ceramic tiles. The tiles may further be organized in an array of small standard tiles, for example 50×50 mm squares, thus imparting improved multi-hit protection. "For special applications it is also possible to produce customized layouts and sizes.

Composite Backing

In one or more embodiments, the superhard composited antiballistic plates are part of complete antiballistic system wherein the coated plates are layered with a composite backing.

In one or more embodiments, the antiballistic article may further comprise an antiballistic backing composite material/fabrics bonded to the antiballistic plate or to a thermal expansion material (if bonded at the back of the plate). The backing material can be made of composite material fabrics woven roving or UD (uni-directional) E-glass or S-glass fabrics, aramid ballistic fabrics, ultra-high molecular weight polyethylene fabrics (UHMWPE), graphite fabrics, or a combination thereof.

In one or more embodiments, the composite backing is generally polymer fibers composed of polyaramide, polyethylene or polypropylene. KEVLAR, ZYLON, ARMOS, and SPECTRA are commercially available fabrics made from high-strength fibers.

In one or more embodiments, the composite backing is made of woven polymer fibers. The term "woven" is meant herein to be any fabric that can be made by weaving; that is, by interlacing or interweaving at least two yarns typically at right angles. Generally such fabrics are made by interlacing one set of yarns, called warp yarns, with another set of yarns, called weft or fill yarns. The woven fabric can have essentially any weave, such as, plain weave, crowfoot weave, basket weave, satin weave, twill weave, unbalanced weaves, and the like. In some embodiments, a satin weave is preferred.

In one or more embodiments, the fibers comprise at least one flexible structure including flexible antiballistic fabrics or flexible antiballistic laminates totally or partially impregnated by one or more of the following: thermoplastic, thermosetting, elastomeric, viscous or viscoelastic polymers.

In one embodiment, stiffening and structural enhancement of the individual polymer layers is achieved by impregnation and subsequent curing of an adhesive. Proper selection of adhesives, such as rubber, polyurethane or epoxies, results in the desired shore hardness, and thereby the required mechanical properties, which can be tailored to the threat requirements. The chemical bond between plate and composite substrate and/or between the individual polymer layers is of significance for the performance of the entire system.

In one or more embodiments, the composite backing may include elements made of a material selected from the group of: rigid or flexible plastomeric foams, elastomeric foams, viscoelastic foams, paper, woven-non-woven fabrics, felts, honeycomb structures, elastomeric polymers, plastomeric polymers, viscous or viscoelastic polymers or mixtures thereof and having a thickness between 0.05 mm and 30 mm.

In one or more embodiments, the antiballistic fabrics or flexible antiballistic laminates totally or partially impregnated by one or more of the following: thermoplastic, thermosetting, elastomeric, viscous or viscoelastic polymers.

In accordance with another embodiment of the present invention, the adhesive is a stiffening-type adhesive having high module of elasticity, preferably greater than 200 kg/mm2 and a curing or bonding temperature for adhesives from about 50 C to about 250 C. The adhesive can be thermoplastic or thermosetting. Suitable adhesive may be selected among others, from epoxy and ceramic glues.

In accordance with another embodiment of the present invention, the antiballistic article may further comprise an anti-shock layer made of foam or rubber material bonded to a face of the antiballistic article. The antiballistic article may further comprise an antiballistic backing made of metals such as: Aluminum alloys, Titanium alloys, steel alloys, magnesium alloys or a combination thereof.

Exemplary Embodiments

In one method of forming a superhard material layer such as PCD or PCBN, diamond particles or grains or CBN grains placed on a substrate and are subjected to high pressure and high temperature so that inter-grain bonding between the diamond grains or CBN grains occurs, forming a polycrystalline ultra hard diamond or CBN layer.

In some instances, the antiballistic plate substrate may be fully cured prior to attachment to the superhard material layer whereas in other cases, the substrate may be green, that is, not fully cured. In the latter case, the substrate may fully cure during the HTHP sintering process. The substrate may be in powder form and may solidify during the sintering process used to sinter the superhard material layer.

As used herein, a multimodal size distribution of a mass of grains includes more than one peak, or that can be resolved into a superposition of more than one size distribution each having a single peak, each peak corresponding to a respective mode. Multimodal polycrystalline bodies are typically made by providing more than one source of a plurality of grains, each source comprising grains having a substantially different average size, and blending together the grains.

Electrophoretic deposition (EPD) refers to a method of forming layers of deposited particles whereby electrically charged particles in liquid dispersion are migrated to one or other electrode by applying an electric potential across two electrodes. Control of the properties of the layers may be achieved by controlling the magnitude and duration of the applied potential, the size and concentration of the suspended particles, and the relative orientation of the two electrodes.

TSP has a material microstructure characterized by a polycrystalline matrix phase comprising bonded-together diamond grains or crystals, and a plurality of voids or empty pores that exist within interstitial regions within the matrix disposed between the bonded-together diamond grains. The TSP material is initially formed by bonding together adjacent diamond grains or crystals at HPHT process conditions. The bonding together of the diamond grains at HPHT conditions is facilitated by the use of an appropriate catalyst material, such as a metal solvent catalyst selected from Group VIII of the Periodic table, thereby forming conventional PCD comprising the catalyst material disposed within the plurality of voids or pores.

Diamond grains useful for forming the TSP component or body may include natural and/or synthetic diamond powders having an average diameter grain size in the range of from submicrometer in size to 100 micrometers, and in the range of from about 1 to 80 micrometers. The diamond powder may contain grains having a mono or multi-modal size distribution. In an example embodiment, the diamond powder has an average particle grain size of approximately 20 micrometers.

The diamond grain powder is cleaned, to enhance the sinterability of the powder by treatment at high temperature, in a vacuum or reducing atmosphere. The diamond powder mixture is loaded into a desired container for placement within a suitable HPHT consolidation and sintering device.

The diamond powder may be combined with a desired catalyst material, e.g., a solvent metal catalyst, in the form of a powder to facilitate diamond bonding during the HPHT process and/or the catalyst material may be provided by infiltration from a substrate positioned adjacent the diamond powder and that includes the catalyst material. Suitable substrates useful as a source for infiltrating the catalyst material may include those used to form conventional PCD materials, and may be provided in powder, green state, and/or already sintered form. A feature of such substrate is that it includes a metal solvent catalyst that is capable of melting and infiltrating into the adjacent volume of diamond powder to facilitate bonding the diamond grains together during the HPHT process. In an example embodiment, the catalyst material is cobalt (Co), and a substrate useful for providing the same is a Co containing cermet material, such as WC—Co.

The diamond powder mixture may be provided in the form of a green-state part or mixture comprising diamond powder that is combined with a binding agent to provide a conformable material product, e.g., in the form of diamond tape or other formable/conformable diamond mixture product to facilitate the manufacturing process. In the event that the diamond powder is provided in the form of such a green-state part, it is desirable that a preheating step take place before HPHT consolidation and sintering to drive off the binder material. In an example embodiment, the PCD material resulting from the above-described HPHT process may have diamond volume content in the range of from about 85 to 95 percent.

The term, "removed," as used with reference to the catalyst material after the treatment process for forming TSP, is understood to mean that a substantial portion of the catalyst material no longer resides within the remaining diamond bonded body. However, it is to be understood that some small amount of catalyst material may still remain in the resulting diamond bonded body, e.g., within the interstitial regions and/or adhered to the surface of the diamond crystals. Additionally, the term, "substantially free," as used herein to refer to the catalyst material in the diamond bonded body after the treatment process, is understood to mean that there may still be some small or trace amount of catalyst material remaining within the TSP material as noted above. Rather than removing the catalyst material from the PCD, the PCD may be rendered TSP by treating the catalyst material used to form the PCD in such a manner so as to render the catalyst material nonreactive or noncatalytic at construction operating temperatures.

In an example embodiment, the PCD body is treated to render the entire body substantially free of the catalyst material. This may be done, by subjecting the PCD body to chemical treatment such as by acid leaching or aqua regia bath, electrochemical treatment such as by electrolytic process, by liquid metal solubility, or by liquid metal infiltration that sweeps the existing catalyst material away and replaces it with another noncatalyst material during a liquid phase sintering process, or by combinations thereof.

The TSP may be formed using thermally stable catalyst systems such as carbonates, sulfites or pyrites.

In an example embodiment, the thickness of the superhard layer is from about 0.1 to 2500 microns. In one or more embodiments, the thickness of the superhard layer is from about 0.2 to 25 microns. In one or more embodiments, the thickness of the superhard layer is from about 0.5 to 5 microns. In one or more embodiments, the thickness of the superhard layer is from about 1 to 3 microns. It is understood that the exact thickness of the layer that is used will depend on the type of superhard material being applied.

The treatment may be one that provides a surface coating of a metal material onto the substrate interface layer surface and/or that introduces the metal material into a region of the TSP body that extends a partial depth from the substrate interface surface.

In one or more embodiments, a lightweight antiballistic plate assembly includes a ceramic antiballistic plate that is strengthened with Polycrystalline Diamond (PCD) nanoparticles. In one embodiment, a strike face of the plate has a layer of PCD attached by sintering. In one embodiment, the ceramic antiballistic plate is made from a mixture of silicon carbide and PCD nanoparticles that is sintered.

In one or more embodiments, PCD consists of micron-sized synthetic diamond powders bonded together by sintering at high pressures and temperatures. PCD can be produced on a cemented carbide substrate, so as to provide a source of solvent metal catalyst to aide sintering, typically cobalt. Under extreme pressures and temperatures, the cobalt from the cemented carbide substrate infiltrates through the layer of micron synthetic diamond powder, causing neighboring grains to grow together. Not only does the small residue of cobalt provide significant toughening, it also renders the material electrically conductive. As such, PCD may be electric-discharge machined, which can be a useful attribute for the hardest known material.

In one or more embodiments, PCD does not necessarily need to be bonded to a carbide substrate. In addition, the sintering aid does not have to be cobalt. A second type of PCD exists, which is known as "thermally stable PCD" or "impact resistant PCD", which is composed of diamond mixed with SiC. The ratio of diamond to silicon carbide (SiC) is generally 9:1. This type of PCD is lighter than the diamond/cobalt blend, cheaper, and more impact and heat resistant, but does not share the electrical properties of a diamond/cobalt combination.

During sintering, a layer of PCD is bonded onto the strike face of B4C, SiC, alumina, or a different armor ceramic. Its extreme hardness, durability, and lightness would make it a real asset. An armor ceramic can be formed of SiC-infiltrated PCD that is lightweight and durable. SiC-infiltrated PCD ceramic is evidently well-suited to punishing conditions and the pressures and temperatures associated with the most intense drilling tasks known. SiC-infiltrated PCD ceramic is incredibly hard—twice as hard, in fact, as B4C that is the next-hardest material in common use. It should be noted that B4C, when subjected to high-pressure shock, undergoes amorphization, leading to failure. This is why SiC, although a heavier, softer, and less ductile material, is preferred versus heavy threats. But impact-resistant PCD bonded to the strike-face of B4C plates can absorb the brunt of the shock, which may be able to prevent B4C failure entirely.

Armor ceramic powders can be used to bond PCD tiles or discs to each other. Using SiC as an example, this would result in a monolithic SiC/PCD plate. In an exemplary embodiment, this would be achieved with armor ceramic nano-powders, which can get into the gaps between arrayed hexagonal or square PCD tiles prior to sintering. A thin layer of PCD tiles can be bonded to kevlar or UHMWPE vests using a prepregnated layer or epoxy to provide for stab protection and heavy threat protection without adding appreciable weight and thickness. It is anticipated that ballistic performance is adequate at 1.5-2 mm thickness such that a curved tiles could be formed into a helmet with superior ballistic protection. Since PCD made of small diamond nanoparticles are transparent, visors can also be fashioned with the enhanced ballistic protection of PCD.

Aggregated diamond nanorod (ADNR) is similar in some respects to PCD. Unlike diamond, which can be made from virtually any carbon source, ADNR is only formed when fullerite is subjected to extremely high pressures and temperatures. Like diamond, ADNR is made entirely of carbon. Like PCD, it is generally polycrystalline due to the way it is produced. Where it differs from both is in (a) its mechanical properties, and (b) its crystal structure. Its hardness and compressibility can barely be tested by modern scientific means.

There has been a wealth of research devoted to the development and evaluation of advanced ceramic materials for the use in passive armor systems to protect vehicles and the individual soldier. Much of this research has focused on ceramics such as alumina (Al2O3), silicon carbide (SiC), and B4C or composites based on these monoliths because these are lightweight, hard ceramics. They also meet the first empirical rule—the ceramic needs to be as hard or harder than the projectile it is trying to defeat. Generally known ceramics are extremely hard, but are significantly softer than diamond. While natural diamond is the hardest material known to man, its availability and cost make it impractical as an armor material. However, continued advances in the synthesis of artificial diamond may make diamond a feasible component of some future armor systems.

Boron nitride (BN) is a synthetically produced material that is used in a variety of high-temperature applications because of its excellent chemical and thermal stability. It has three crystalline forms: a graphite-like structure and a wurtzite structure, both of which are hexagonal, and a diamond-like structure which is cubic, and it is produced using high pressures similar to what is used to produce synthetic diamond. The cubic form, cubic boron nitride (CBN) is of interest because it is lightweight and harder than the traditional ceramics being used in a variety of armor applications. CBN is widely used in the abrasive and machine tool industry because it does not react with iron (Fe), nickel (Ni), and related alloys at the high temperatures generated during the cutting process; on the other hand, diamond does react and breaks down at high temperatures. Cubic boron nitride disks are a commercially available material with a manufacturer designation of AMB90 (Element Six, 35 West 45th St., New York, N.Y. 10036, USA.).

Figure 2A:
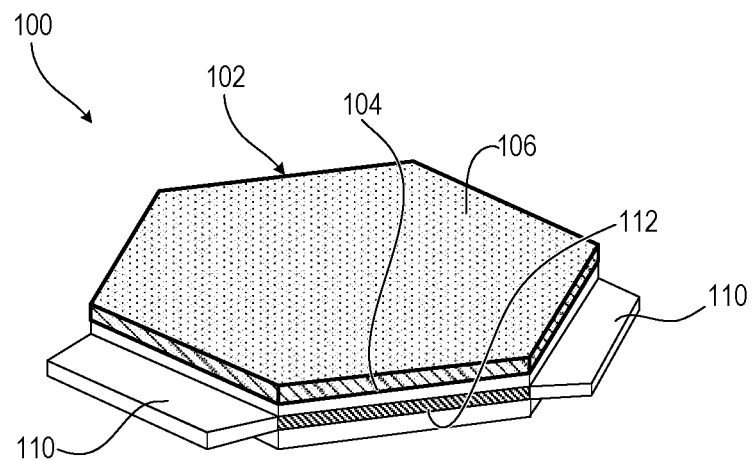
FIG. 2A illustrates a perspective view of an example lightweight antiballistic plate with interlocking tabs and slots for the antiballistic plate assembly of FIG. 1, according to one or more embodiments.
Figure 2B:
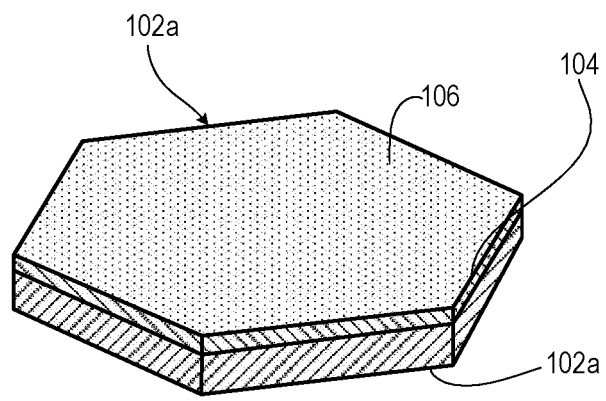
FIG. 2B illustrates a perspective view of an example hexagonal lightweight antiballistic plate for the antiballistic plate assembly of FIG. 1, according to one or more embodiments.
Figure 3:
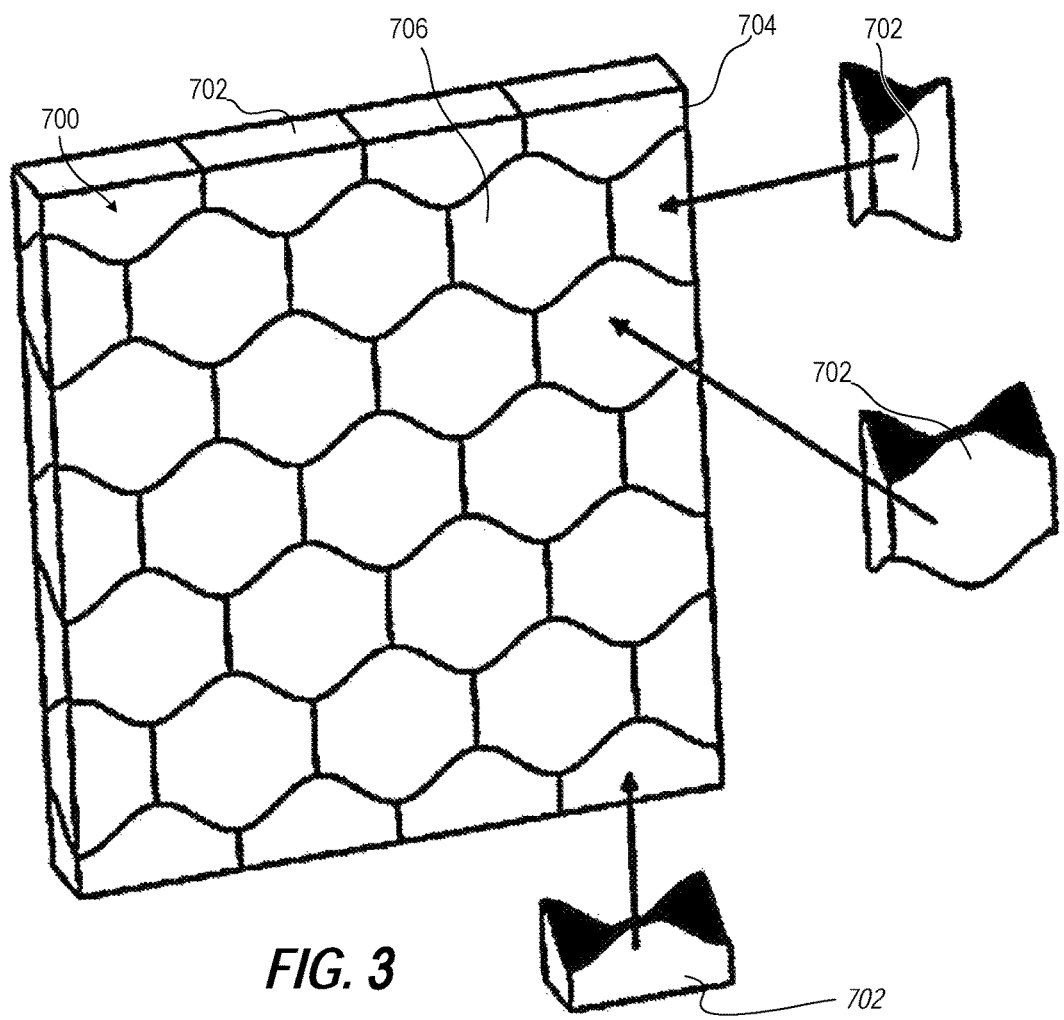
FIG. 3 illustrates a perspective view of a second example ceramic plate formed of osteomorphic ceramic modules having a first topological interlocking tile shape, according to one or more embodiments.
Figure 4:
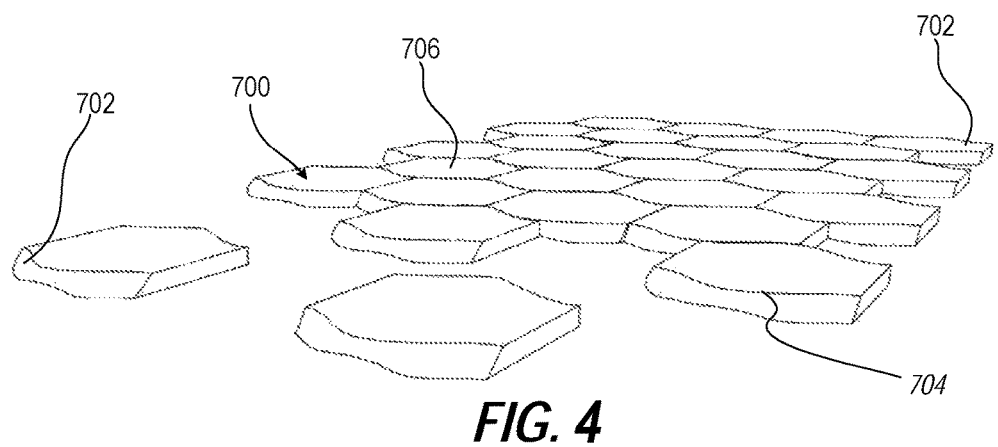
FIG. 4 illustrates a partially disassembled front left perspective view of the second example ceramic plate of FIG. 3, according to one or more embodiments.
Figure 5:
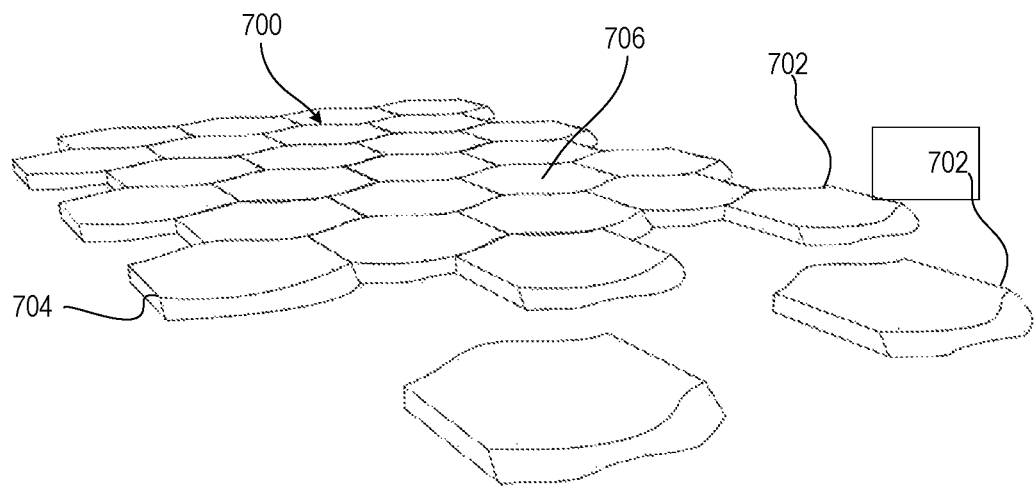
FIG. 5 illustrates a partially disassembled front perspective view of the second example ceramic plate of FIG. 3, according to one or more embodiments.
Figure 6:
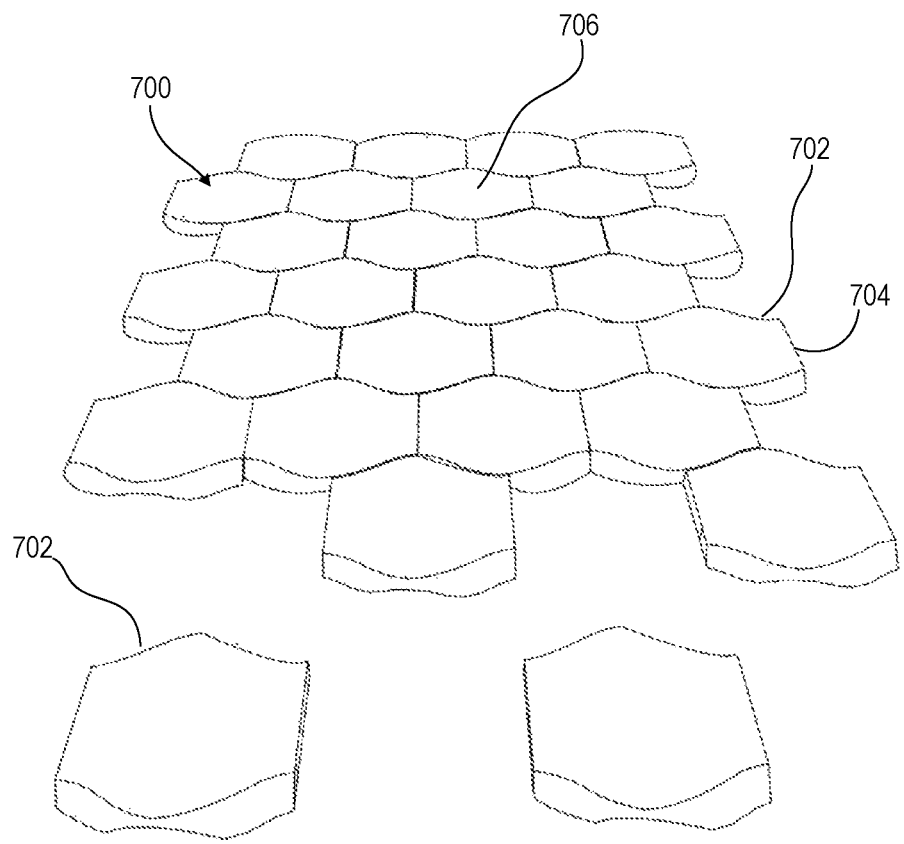
FIG. 6 illustrates a partially disassembled front left perspective view of the second example ceramic plate of FIG. 3, according to one or more embodiments.
Figure 7:
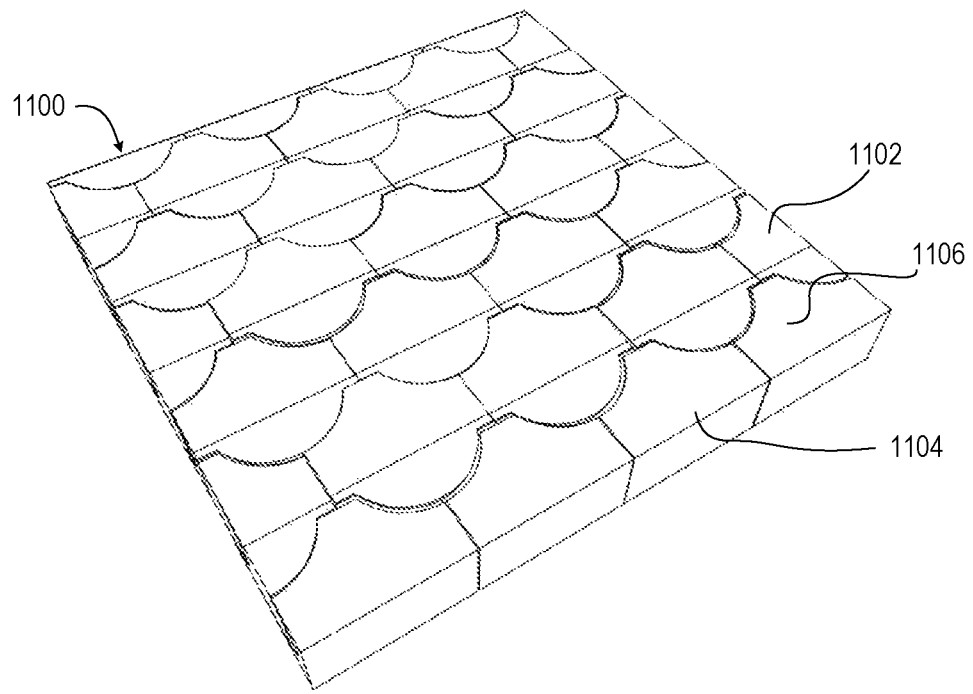
FIG. 7 illustrates a perspective view of a third example ceramic plate formed of osteomorphic ceramic modules having a second topological interlocking tile shape, according to one or more embodiments.
Figure 8:
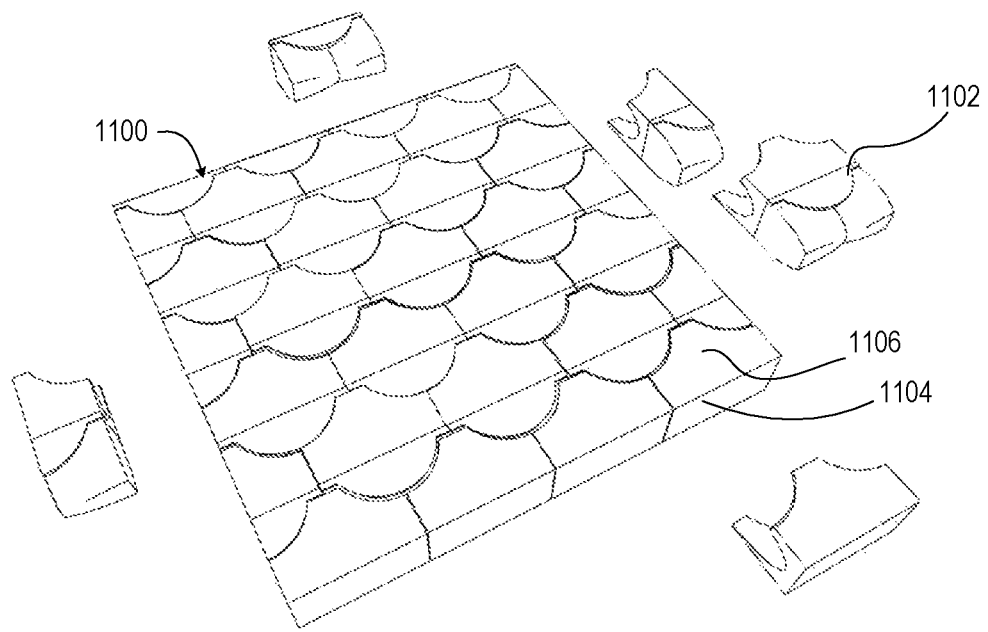
FIG. 8 illustrates a partially disassembled perspective view of the third example ceramic plate of FIG. 7 formed of osteomorphic ceramic modules having the second topological interlocking tile shape, according to one or more embodiments.
Figure 9:
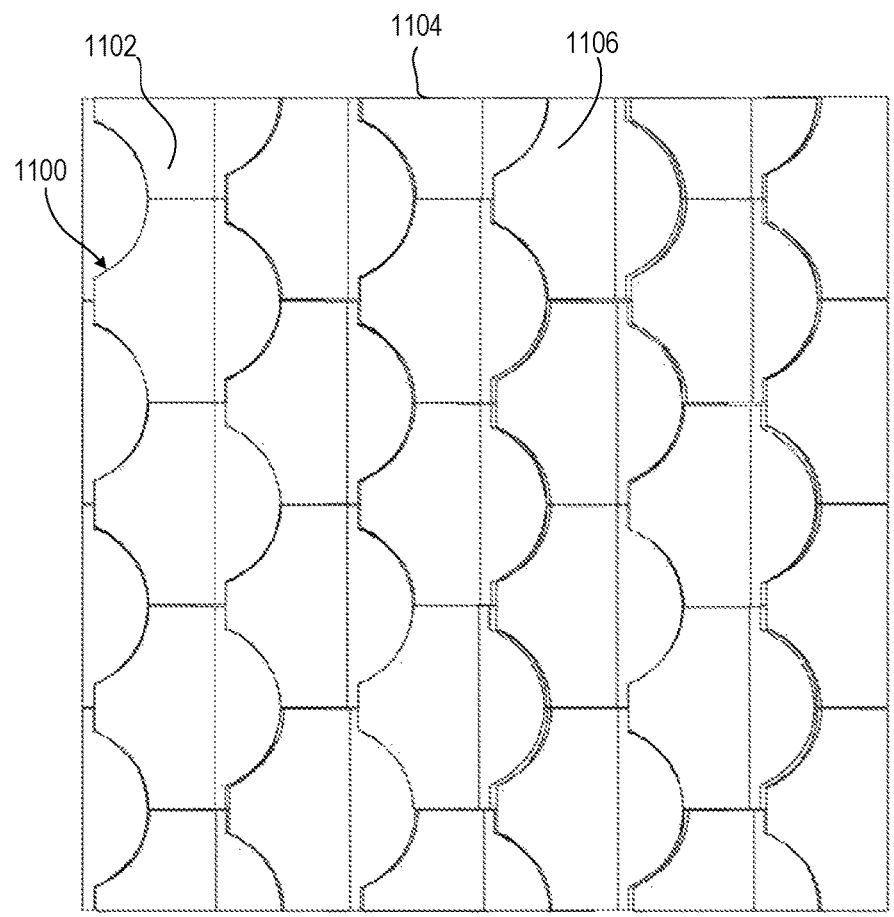
FIG. 9 illustrates a top view of the third example ceramic plate of FIG. 7 formed of osteomorphic ceramic modules having the second topological interlocking tile shape, according to one or more embodiments.
Figure 10:
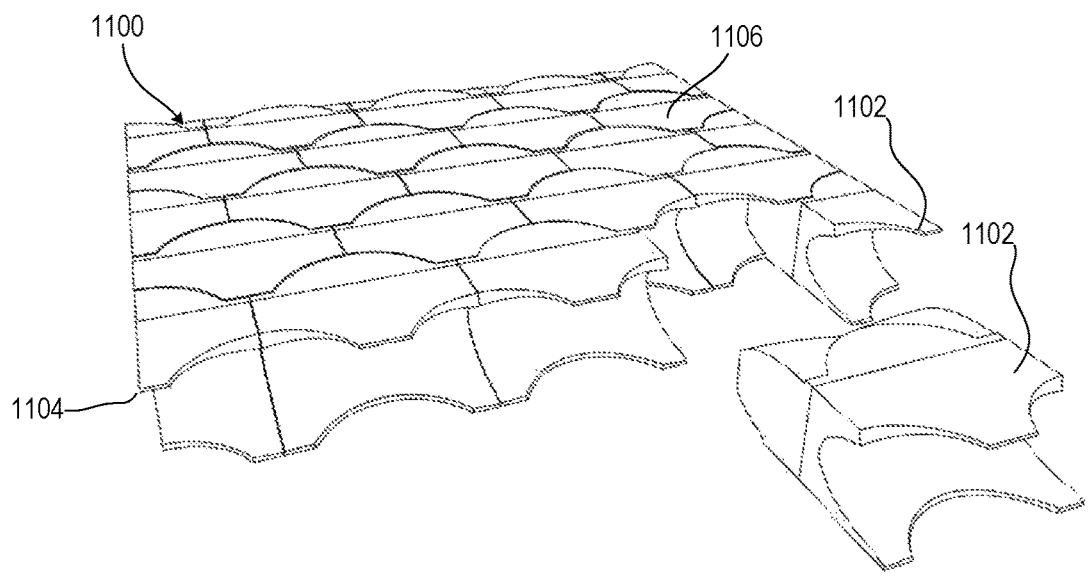
FIG. 10 illustrates a partially disassembled perspective view of the third example ceramic plate of FIG. 7 formed of osteomorphic ceramic modules having the second topological interlocking tile shape, according to one or more embodiments.
Figure 11:
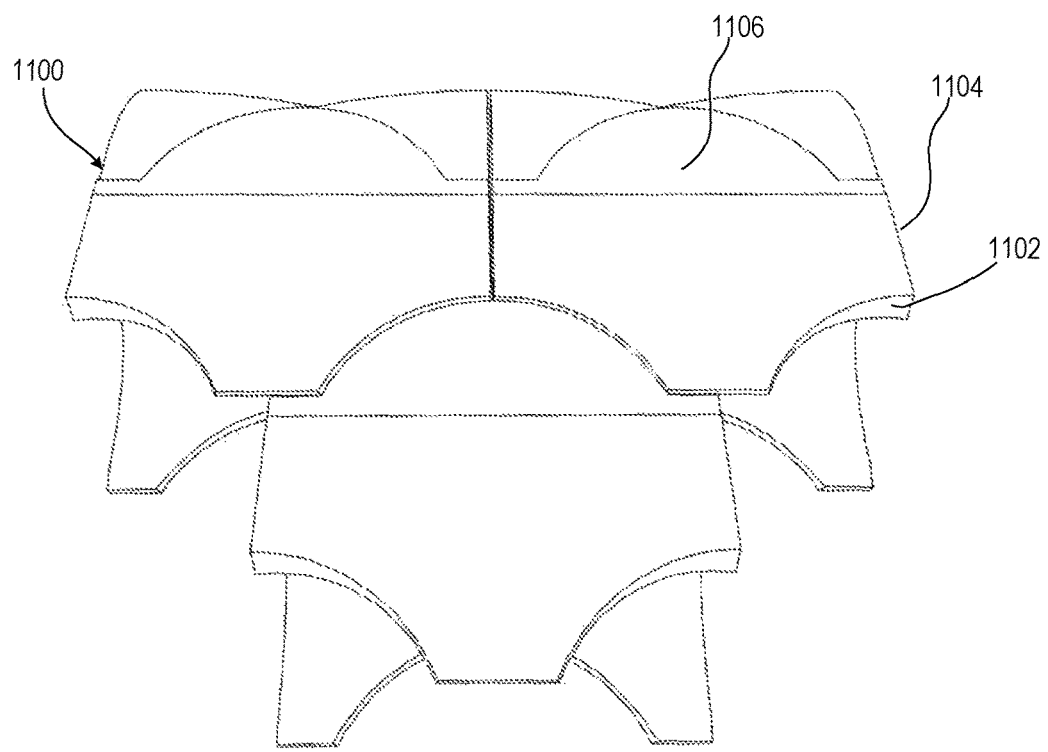
FIG. 11 illustrates a detailed front perspective view of three osteomorphic ceramic modules of FIG. 7 having the second topological interlocking tile shape, according to one or more embodiments.
Figure 12:
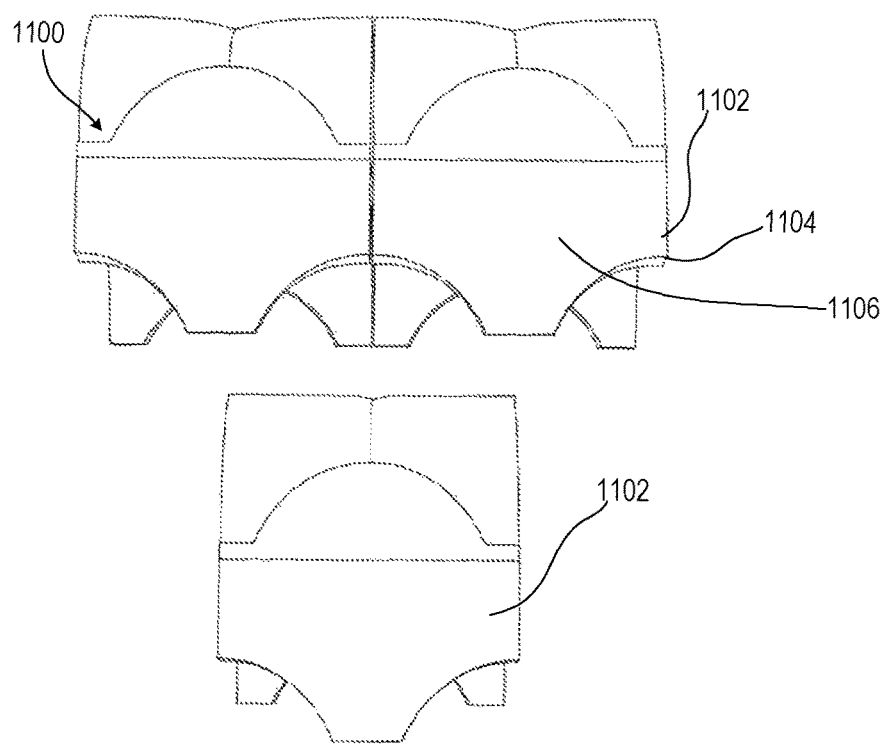
FIG. 12 illustrates a partially disassembled perspective view of three osteomorphic ceramic modules of FIG. 10 having the second topological interlocking tile shape, according to one or more embodiments.
Figure 13:
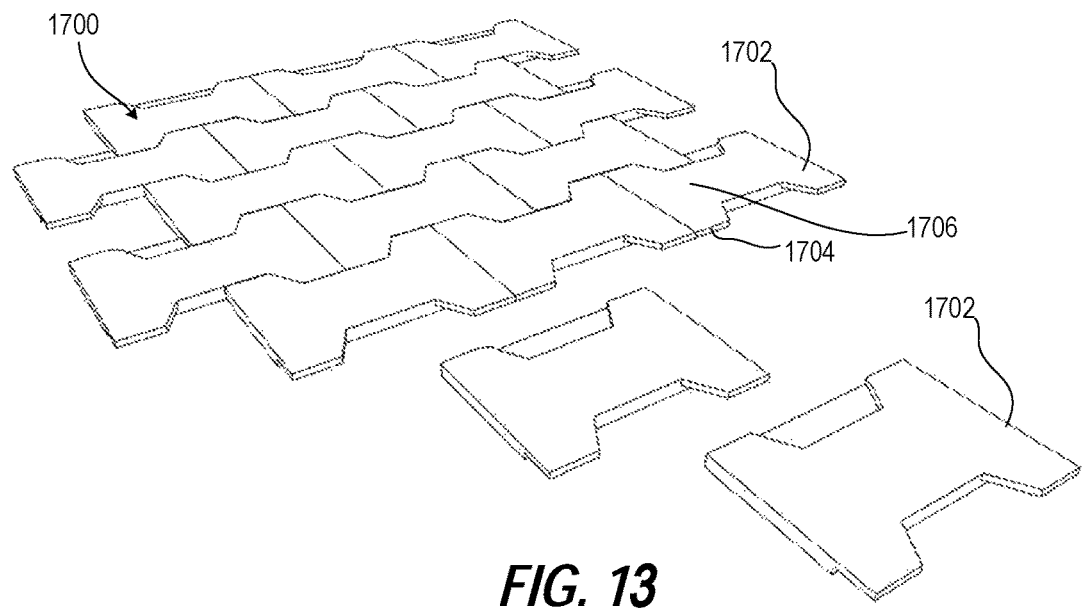
FIG. 13 illustrates a partially disassembled front left perspective view of a fourth example ceramic plate formed of osteomorphic ceramic modules having a third topological interlocking tile shape, according to one or more embodiments.
Figure 14:
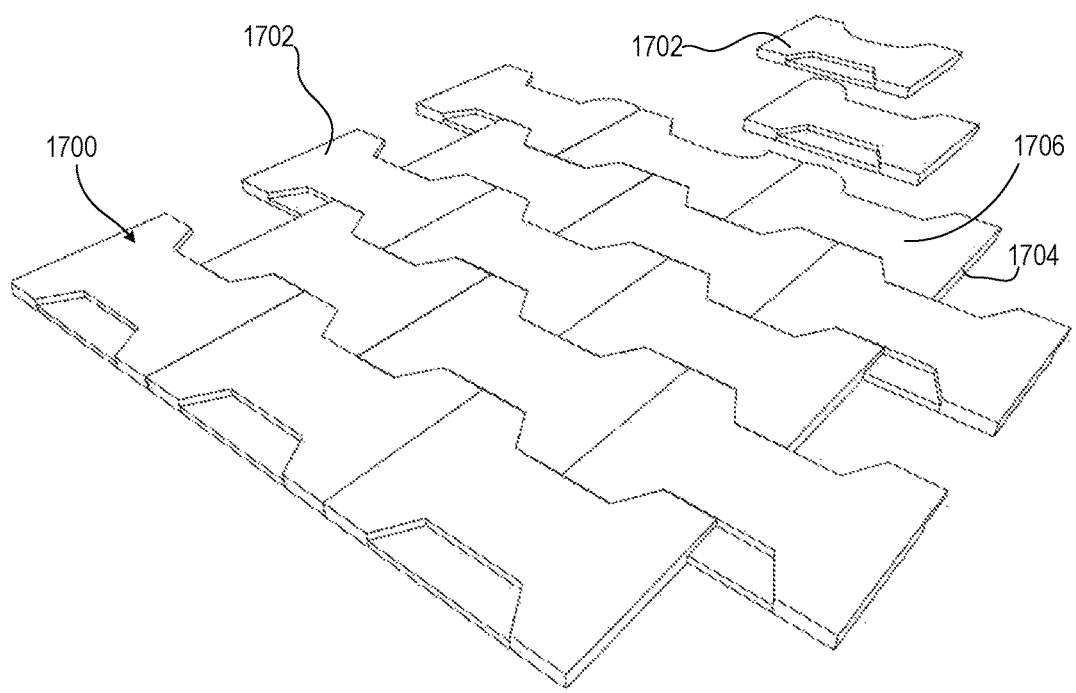
FIG. 14 illustrates a partially disassembled back left perspective view of the fourth example ceramic plate of FIG. 13 formed of osteomorphic ceramic modules having the third topological interlocking tile shape, according to one or more embodiments.
Figure 15:
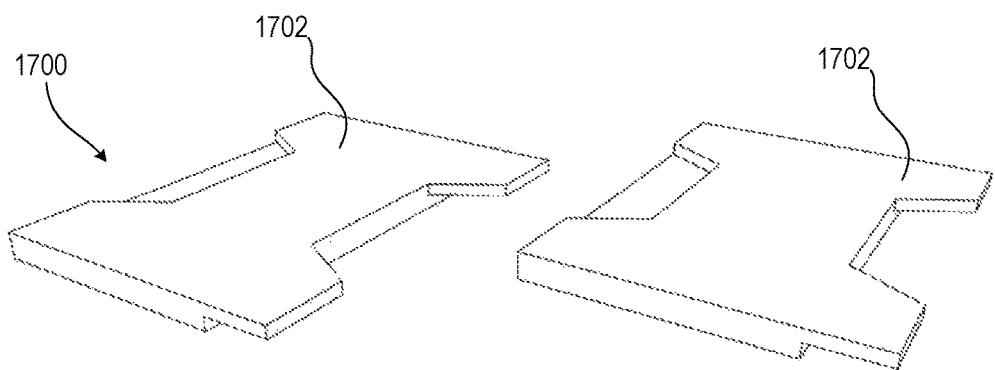
FIG. 15 illustrates a left perspective view of two osteomorphic ceramic modules having the third topological interlocking tile shape of FIG. 13, according to one or more embodiments.
Figure 16:
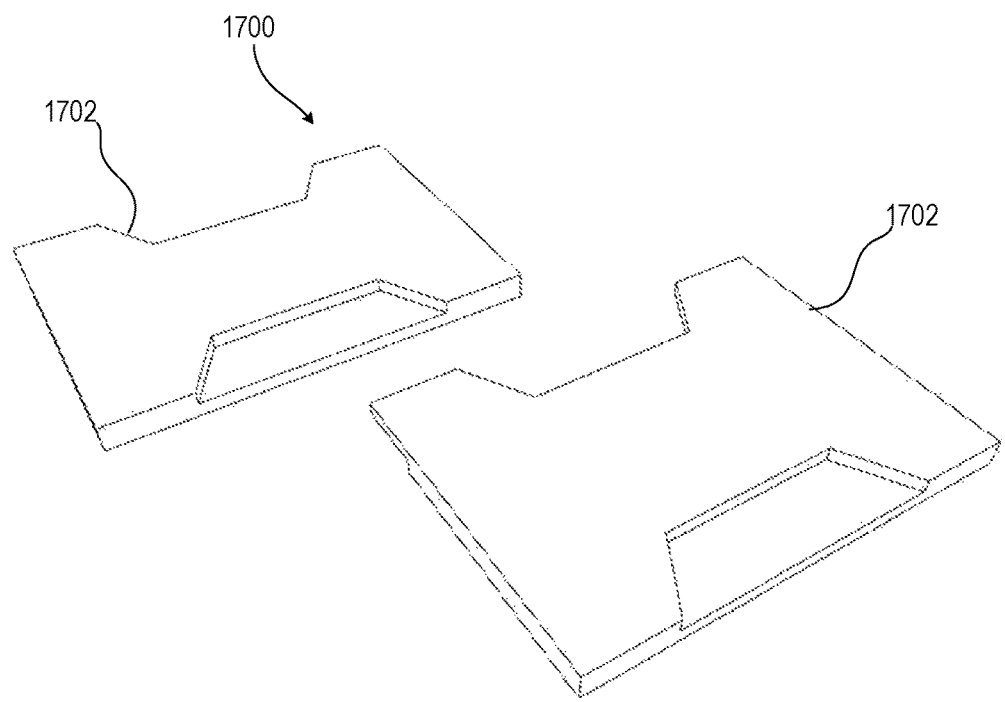
FIG. 16 illustrates a front left perspective view of the two osteomorphic ceramic modules having the third topological interlocking tile shape of FIG. 15, according to one or more embodiments.

Turning to the Drawings, FIG. 1, 2A illustrate a lightweight antiballistic plate assembly 100 (FIG. 1) of ceramic antiballistic plates 102 having a strike face 104 with an attached Polycrystalline Diamond (PCD) layer 106. In one or more embodiments, the PCD layer 106 is PCD nanoparticles sintered to the strike face 104. For example, the ceramic antiballistic plate 102 can be a cemented carbide substrate that contains cobalt that infiltrates the PCD nanoparticles during sintering. Alternatively, the ceramic antiballistic plate 102 can be one of monolithic boron carbide (B4C), silicon carbide (SiC), and alumina. With particular reference to FIG. 2A, the ceramic antiballistic plates 102 can be a hexagonal ceramic module including three tabs 110 separated by three slots 112 for interlocking. The interlocking can improve multi-hit performance and overall durability. With particular reference to FIG. 1, the light lightweight antiballistic plate assembly 100 has ceramic antiballistic plates 102 that are attached in an array by sintered armor ceramic nanopowder in joints 108 between adjacent ceramic antiballistic plates 102. As an alternative to an attached layer, a ceramic antiballistic plate 102 can be formed by mixing PCD nanoparticles in a silicon carbide (SiC) precursor and sintered, such as in a 9:1 ratio. FIG. 2B illustrates an alternative hexagonal ceramic antiballistic plate 102a with a strike face 104 of a PCD layer 106 that is attached to a ceramic antiballistic plate 102a that does not include tabs and slots.

FIGS. 3-6 illustrate another example lightweight composite antiballistic plate assembly 700 that includes replaceable and interlocking rectangular ceramic plates 702 having a strike face 704 comprising a PCD layer 706. The ceramic plates 702 are formed as osteomorphic ceramic modules having a first topological interlocking shape, according to one or more embodiments.

FIGS. 7-12 illustrate another example lightweight composite antiballistic plate assembly 1100 that includes replaceable and interlocking rectangular ceramic plates 1102 having a strike face 1104 comprising a PCD layer 1106. The ceramic plates 1102 are formed as osteomorphic ceramic modules having a second topological interlocking shape, according to one or more embodiments.

FIGS. 13-16 illustrate another example lightweight composite antiballistic plate assembly 1700 that includes replaceable and interlocking rectangular ceramic plates 1702 having a strike face 1704 comprising a PCD layer 1706. The ceramic plates 1702 are formed as osteomorphic ceramic modules having a third topological interlocking shape, according to one or more embodiments.

FIGS. 1-2 illustrate a lightweight composite antiballistic plate assembly 100 includes a plate 102 of replaceable and interlocking modules 104. In one embodiment the modules 104 are formed from hot-pressed ceramic slurry fortified with nanotubes made from carbon, boron nitride, and/or tungsten disulfide. The molded and sintered ceramic slurry and ceramic plate can be made of aluminum oxide ($Al_2O_3$), boron carbide ($B_4C$), silicon carbide (SiC) titanium diboride ($TiB_2$), aluminum nitride, silicone nitride, aluminum magnesium boride, sintered polycrystalline cubic boron nitride, and glass-ceramic. The ceramic plates 102 can have a strike face 104 to deflect a ballistic projectile that is directed in frontal direction.

In at least one embodiment, the ceramic antiballistic plate includes a cemented carbide substrate that contains cobalt that infiltrates the PCD nanoparticles during sintering. In one or more embodiments, the ceramic antiballistic plate is one of monolithic boron carbide (B4C), silicon carbide (SiC), and alumina.

In another embodiment, the lightweight antiballistic plate assembly 100 according to the invention comprises a plate 102 comprising a substrate material selected from the group consisting of ceramic, metal, glass and graphite, or combinations thereof. A particularly preferred material for the substrate is metal. In such case the metal in the substrate preferably has a melting point of at least 350° C., more preferably at least 500° C., most preferably at least 600° C. Suitable metals include aluminum, magnesium, titanium, copper, nickel, chromium, beryllium, iron and copper including their alloys as e.g., steel and stainless steel and alloys of aluminum with magnesium (so-called aluminum 5000 series), and alloys of aluminum with zinc and magnesium or with zinc, magnesium and copper (so-called aluminum 7000 series). In the alloys, the amount of e.g. aluminum, magnesium, titanium and iron preferably is at least 50 wt. %. Preferred substrates comprising aluminum, magnesium, titanium, nickel, chromium, beryllium, iron including their alloys. More preferably, the substrate is based on aluminum, magnesium, titanium, nickel, chromium, iron and their alloys. This results in a light antiballistic article with a good durability. Even more preferably, the iron and its alloys in the substrate have a Brinell hardness of at least 500. Most preferably the substrate is based on aluminum, magnesium, titanium, and their alloys.

In one or more embodiments, the plate 102 has a thickness ranging between 0.1 and 2.0 mm and is in the form of metallic sheet, metallic fabric, or metallic grid/net. In one embodiment, the plate 102 is selected from the group consisting of E-glass, S-glass, aramid ballistic fabrics, ultra-high molecular weight polyethylene (UHMWPE), PPTA (p-phenyleneterepthalamide), graphite or combinations thereof, high strength aluminum alloys, high strength magnesium alloys, high strength steel alloys, high strength titanium alloys or combinations thereof. In one embodiment, the plate 102 is selected from the group consisting of metals or metallic alloys such as high strength aluminum alloys, high strength magnesium alloys, high strength steel alloys or high strength titanium alloys. In another embodiment, the metal or metallic alloy is selected from high strength aluminum alloy as AL7075/AL6061/AL2024 alloys, high strength magnesium alloys as AZ90/AZ91, high strength steel alloys as SAE 4340/SAE 4140, high strength titanium alloys as Ti-6Al-4V or other metallic alloys such as brass, bronze, nickel alloys, tin alloys, beryllium alloys, etc.

In another embodiment, the plate 102 is made of composite material fabrics woven roving or UD (Uni-directional) E-glass or S-glass fabrics, aramid ballistic fabrics, ultra-high molecular weight polyethylene fabrics (UHMWPE), graphite fabrics, or a combination thereof. Aramid ballistic fabric suitable as backing material is for instance one of the following commercial fabrics: Twaron, manufactured by Teijin Twaron in Germany/The Netherlands and Kevlar 29 manufactured by Dupont USA. UHMWPE fabric suitable as backing material can be one of the following commercial fabrics: Spectra Shields PCR, manufactured by Honeywell International, Inc. of Colonial Heights, Va. or Dyneema HB2/HB26/HB50 manufactured by DSM USA or DSM of the Netherlands.

Ultra-high-molecular-weight polyethylene (UHMWPE, UHMW) is a subset of the thermoplastic polyethylene. Also known as high-modulus polyethylene, (HMPE), or high-performance polyethylene (HPPE), it has extremely long chains, with a molecular mass usually between 2 and 6 million unified atomic mass unit (symbol: u). The longer chain serves to transfer load more effectively to the polymer backbone by strengthening intermolecular interactions. This longer chain thus results in a very tough material, with the highest impact strength of any thermoplastic presently made. UHMWPE is odorless, tasteless, and nontoxic. It is highly resistant to corrosive chemicals except oxidizing acids; has extremely low moisture absorption and a very low coefficient of friction; is self-lubricating; and is highly resistant to abrasion, in some forms being fifteen (15) times more resistant to abrasion than carbon steel. Its coefficient of friction is significantly lower than that of nylon and acetal, and is comparable to that of polytetrafluoroethylene (PTFE), commonly referred to as TEFLON®. However, UHMWPE has better abrasion resistance than PTFE.

In one embodiment, the geometries of the plate 102 comprise one or more geometrical shapes such as circles, squares, triangles, rectangles, hexagons, octagons or a combination thereof.

In one embodiment, the ceramic component is made with carbide oxides or nitrides (for example alumina, boron carbide, silicon carbide, boron nitride and silicon nitride) based ceramics. In another embodiment, the ceramic element is embedded in a polymeric structure that can include reinforcing fibers like carbon, aramid or glass.

In one embodiment, the ceramic component comprises a glass-ceramic component comprises one or more oxides selected from the group consisting of $Al_2O_3$, $ZrO_2$, $Li_2O$, and $TiO_2$. In another embodiment, the glass-ceramic component further comprises, one or more of the components BaO, CaO, $K_2O$, MgO, $Na_2O$, $P_2O_5$, $SnO_2$, $As_2O_3$, $Sb_2O_3$, $V_2O_5$, CoO, NiO, $Fe_2O_3$, each between 0 and 5 weight percent, is contained as additive.

In accordance with another embodiment of the present invention, the antiballistic article may further comprise an anti-shock layer made of foam or rubber material bonded to the front face of the antiballistic article as is commonly done in practice to defend the ceramic plate from breaking. The antiballistic article may further comprise an antiballistic backing made of metals such as aluminum alloys, titanium alloys, steel alloys, magnesium alloys or a combination thereof.

In another embodiment of the present invention, the antiballistic article is encapsulated in an outer shell of antiballistic material with curable resin selected from epoxy (e.g., FM73 of Cytec, EA 9628 & EA 9309 of Hysol/Henkel, F161 of HEXCEL, Araldite 2015 of Huntsman), polyester, phenolic (e.g., HEXCEL F120 or HT93, or polyurethane resin (e.g., RENCAST FC 52 (Vantico), Biresin U1305 or SIKAFLEX 201 of Sika Deutschland) or thermoplastic resin (e.g. polyolefin, polyester, polyurethane, PVC and other vinyl thermoplastic resins). This outer shell can be selected from aramid fabric, UHMWPE, E-glass, S-glass, graphite fabric, or combination hybrids and can have the form of a plain weave cloth, a unidirectional tape, filament winding, or braiding.

In one embodiment the outer shell comprises at least one layer of multifilament yarn. As used herein, the term "multifilament yarns", also referred to below simply as "yarns", refers to linear structures consisting of two or more filaments of in principle endless length. Such multifilaments are known to the skilled person. There is in principle no restriction on the number of individual filaments comprising a multifilament yarn. A multifilament generally comprises between 10 and 500 filaments, and frequently between 50 and 300 filaments. Multifilament yarns for anti ballistic applications are usually yarns from the ultra high molecular weight polyethylene (UHMWPE) or aramid (poly paraphenyleneterephthalamide) type, however, also other high performance fibers as mentioned below can be applied. The layers of multifilament yarns can consist of the family of para-aramid multifilament yarns, known and sold under the trade names like e.g. Twaron, Kevlar, Heracron, Pycap or Artec, high strength polyethylene multifilament yarns like Dyneema, Spectra or other various UHMWPE multifilament yarns, high strength glass multifilament yarns known as E-glass, R-glass and S-glass. Furthermore other high performance multifilament yarns like carbon multifilament yarns, HS basalt multifilament yarns; polybenzoxazole (PBZO) multifilament yarns, polybenzothiazole (PBZT) multifilament yarns, HDPA multifilament yarns, UHMWPA multifilament yarns, UHMWPP multifilament yarns, HDPP multifilament yarns, HDPE multifilament yarns etc.; basically any multifilament high strength yarn with a strength above 60 cN/tex as they are in use in this anti-ballistic and "life protection" industry or composite industry can be applied.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A lightweight antiballistic plate assembly comprising:
an antiballistic plate having a strike face; and
a superhard protective layer attached to the strike face of the antiballistic plate;
wherein the antiballistic plate comprises a material selected from the group consisting of polymers, cermets, ceramics, silicon, sapphire, carbon-carbon, carbon-fiber, fiberglass, metals, amorphous metals, metallic glasses, nanostructured metals and composites and combinations thereof;
wherein the superhard protective layer comprises one or more layers of polycrystalline diamond;

wherein the polycrystalline diamond (PCD) material comprises an aggregation of diamond grains and wherein a substantial portion of the diamond grains are directly inter-bonded with each other;

wherein the superhard protective layer comprises silicon carbide (SiC) as a matrix disposed between the bonded-together diamond grains; and wherein the superhard protective layer comprises at least about 75 volume percent carbon.

2. The lightweight antiballistic plate assembly of claim 1, wherein the superhard protective layer is attached to the strike face of the antiballistic plate assembly using one or more of sintering, adhesive bonding, forming a transition layer between the strike face of the plate and the superhard protective coating layer and chemical vapor deposition.

3. The lightweight antiballistic plate assembly of claim 2, wherein the superhard protective layer further comprises a catalyst metal selected from the group consisting of Fe, Ni, Co, Si and Mn, and alloys thereof.

4. The lightweight antiballistic plate assembly of claim 3, wherein the superhard protective layer further comprises a sintering aid.

\* \* \* \* \*